US012379686B2

(12) United States Patent
Shibuya et al.

(10) Patent No.: US 12,379,686 B2
(45) Date of Patent: Aug. 5, 2025

(54) IMAGE FORMING APPARATUS

(71) Applicant: CANON KABUSHIKI KAISHA, Tokyo (JP)

(72) Inventors: Ryota Shibuya, Kanagawa (JP); Masaaki Takeuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/503,868

(22) Filed: Nov. 7, 2023

(65) Prior Publication Data

US 2024/0152084 A1 May 9, 2024

(30) Foreign Application Priority Data

Nov. 8, 2022 (JP) ................................ 2022-178572
Sep. 22, 2023 (JP) ................................ 2023-157460

(51) Int. Cl.
*G03G 21/16* (2006.01)
*G03G 15/00* (2006.01)

(52) U.S. Cl.
CPC ....... *G03G 21/1619* (2013.01); *G03G 15/757* (2013.01); *G03G 21/1647* (2013.01); *G03G 21/1652* (2013.01); *G03G 2221/1657* (2013.01)

(58) Field of Classification Search
CPC .. G03G 15/1615; G03G 15/757; G03G 15/80; G03G 21/1619; G03G 21/1647; G03G 21/1652; G03G 21/1857; G03G 2221/1657; G03G 2221/166
See application file for complete search history.

(56) References Cited

U.S. PATENT DOCUMENTS

2011/0048792 A1* 3/2011 Masaka .............. G03G 21/1652 174/480
2014/0213411 A1* 7/2014 Ueno .................... F16D 48/064 477/8
2015/0016835 A1 1/2015 Kakutani
2016/0109848 A1 4/2016 Ohata
2017/0308026 A1* 10/2017 Imaizumi ........... G03G 15/0233
2017/0322507 A1* 11/2017 Ochi .................. G03G 15/6508

FOREIGN PATENT DOCUMENTS

JP 2000127555 A 5/2000
JP 2002320114 A 10/2002
JP 2005037706 A 2/2005
JP 2012091465 A * 5/2012

OTHER PUBLICATIONS

Machine Translation of JP 2012-091465. May 17, 2012. (Year: 2012).*

* cited by examiner

*Primary Examiner* — Carla J Therrien
(74) *Attorney, Agent, or Firm* — Canon U.S.A., Inc. IP Division

(57) ABSTRACT

An image forming apparatus includes a first main body side plate, a second main body side plate, a drive side plate, a drive gear train disposed between the drive side plate and the first main body side plate, and a cable guide disposed between the first main body side plate and the drive side plate. The drive gear train includes a rotary gear, and the cable guide overlaps with a part of the rotary gear when viewed in a rotational axis direction of the rotary gear.

14 Claims, 9 Drawing Sheets

IMAGE FORMING APPARATUS

BACKGROUND OF THE INVENTION

Field of the Invention

The present invention relates to an image forming apparatus.

Description of the Related Art

In conventional image forming apparatuses, there is known a configuration in which a drive gear train is disposed outside a main body side plate, and a drive side plate is attached to the main body side plate to cover the drive gear train from the outside so that the drive gear train is interposed between the main body side plate and the drive side plate.

Japanese Patent Application Laid-Open No. 2005-37706 discusses a hollow member for connecting a hole on the main body side plate with a hole on the drive side plate, and also discusses a configuration for guiding cables via this hollow member. This configuration enables the cable to be wired through the main body side plate and the drive side plate without interference with the drive gear train. More specifically, the configuration makes it possible to connect a circuit board provided inside the main body side plate with a circuit board provided outside the drive side plate with the shortest distance.

However, in the configuration discussed in Japanese Patent Application Laid-Open No. 2005-37706, the hollow member needs to be disposed while avoiding the drive gear train. In a configuration where the drive gear train is tightly arranged with no extra space, there is a concern that providing the hollow member increases the size of the apparatus. In recent years, there has been a growing demand for more compact apparatuses.

SUMMARY OF THE INVENTION

The present invention is directed to preventing an increase in size of an apparatus.

According to an aspect of the present invention, an image forming apparatus includes a first main body side plate, a second main body side plate, wherein the first and the second main body side plates are disposed so that an image forming unit configured to form an image on a recording material is interposed between the first and the second main body side plates, a drive side plate attached to the first main body side plate, a drive gear train, the drive gear train being disposed on a side opposite to a side where the image forming unit is disposed across the first main body side plate, the drive gear train being disposed between the drive side plate and the first main body side plate, and a cable guide configured to guide a cable, the cable guide being disposed between the first main body side plate and the drive side plate, wherein the drive gear train includes a rotary gear configured to rotate, and the cable guide is disposed so that the cable guide overlaps with a part of the rotary gear when viewed in a rotational axis direction of the rotary gear.

Further features of the present invention will become apparent from the following description of embodiments with reference to the attached drawings.

DESCRIPTION OF THE EMBODIMENTS

<Overall Structure of Image Forming Apparatus>

Figure 1:
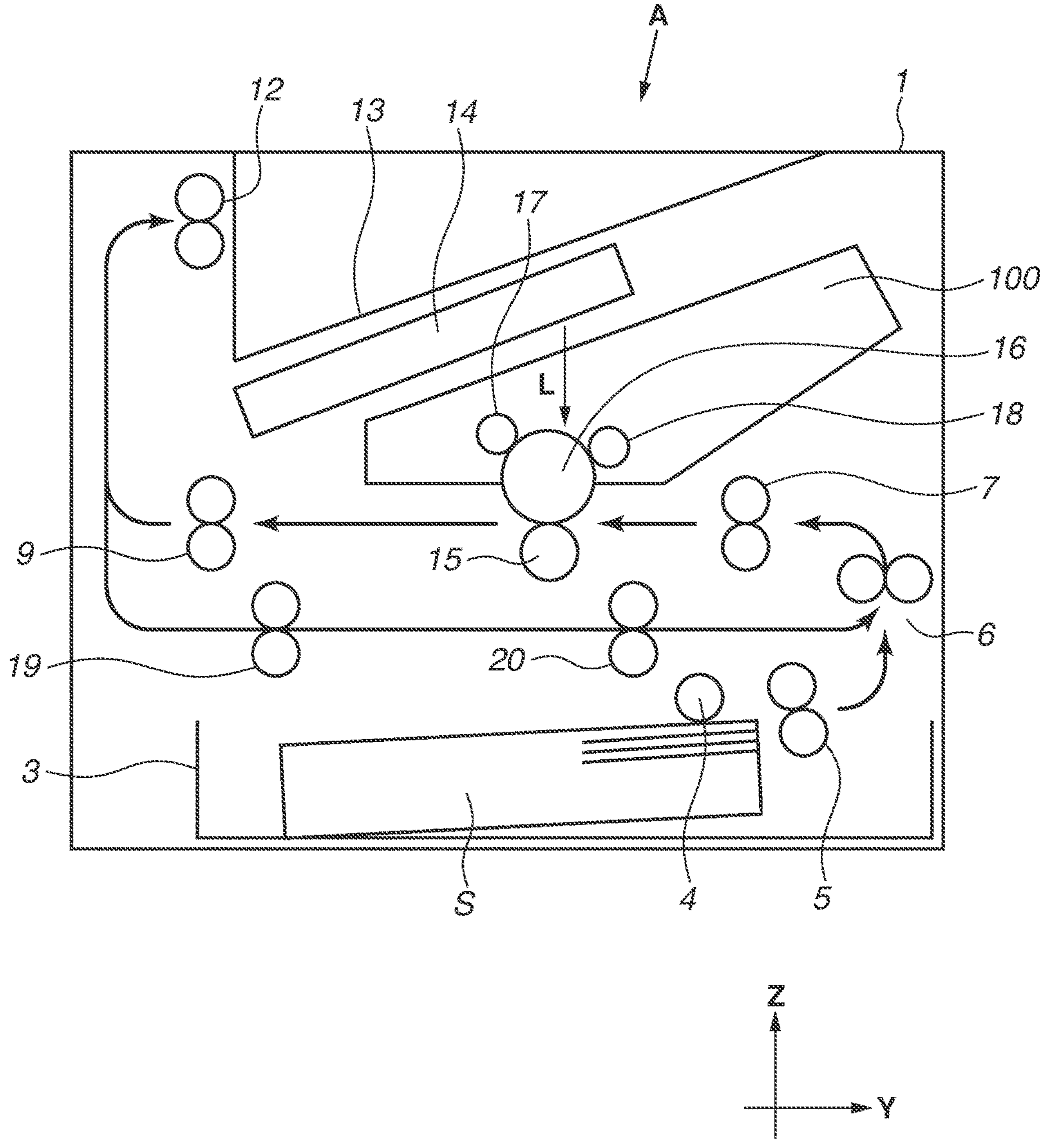
FIG. 1 is a schematic view illustrating an internal structure of an image forming apparatus.

An overview of an image forming apparatus according to a first embodiment will be described below with reference to FIG. 1. FIG. 1 is a schematic view illustrating an internal structure of the image forming apparatus according to the first embodiment of the present invention. In the following description, the image forming apparatus will be described by particularly taking an electrophotographic monochromatic laser beam printer as an example.

In the following description, in a case where an image forming apparatus A is installed on a horizontal surface, the height direction (vertical direction) of the image forming apparatus A is the Z direction. The direction that intersects with the Z direction and is parallel to the axial direction (main scanning direction) of a photosensitive drum 16 (described below) is the X direction. The direction intersecting with the X and Z directions is the Y direction. Desirably, the X, Y, and Z directions perpendicularly intersect with each other. For convenience, the positive and negative sides in the X direction are referred to as the right and left sides, respectively, the positive and negative sides in the Y direction are referred to as the front and back sides, respectively, and the positive and negative sides in the Z direction are referred to as the upper and lower sides, respectively.

As illustrated in FIG. 1, an apparatus body 1 of the image forming apparatus A includes a process cartridge 100. The process cartridge 100 includes a photosensitive drum 16, a charge roller 17, and a developing roller 18 and is attachable to and detachable from the apparatus body 1. These members for image formation can be collectively replaced by replacing the process cartridge 100. In image formation, the photosensitive drum 16 rotates, and the surface of the photosensitive drum 16 is charged by the charge roller 17. The photosensitive drum 16 is irradiated with a laser beam L based on image information from an optical system (scanner) 14, and an electrostatic latent image is formed on the photosensitive layer of the photosensitive drum 16. The developing roller 18 develops the electrostatic latent image using toner to form a developer image on the photosensitive drum 16.

Then, in synchronization with the formation of the developer image, a recording material S placed on a cassette 3 is conveyed by a pickup roller 4, a feed roller pair 5, a conveyance roller pair 6, and a registration roller pair 7. The developer image formed on the photosensitive drum 16 is transferred to a recording material S when a transfer roller 15 provided in the apparatus body 1 is applied with a voltage. Then, the recording material S with the developer image transferred thereto is conveyed to a fixing unit 9. The fixing unit 9 applies heat and pressure to the recording material S while the recording material S is passing through the fixing unit 9 so as to fix the developer image to the recording material S. Then, the record material S with the developer image fixed thereto is discharged to a discharge tray 13 outside the apparatus via a discharge roller pair 12.

When performing two-sided printing, an image is formed on one side of the recording material S, and then the rotational direction of the discharge roller pair 12 is reversed in a state where the discharge roller pair 12 nips the recording material S, so that the recording material S is pulled back into the apparatus body 1. Then, the recording material S is conveyed to a two-sided conveying path, and then conveyed to the conveyance roller pair 6 again by two-sided conveyance roller pairs 19 and 20. Thereafter, the record material S with an image formed on one side thereof is conveyed by the registration roller pair 7 to a nip portion formed by the photosensitive drum 16 and the transfer roller 15, so that an image is formed on the other side of the recording material S.

Figure 2:
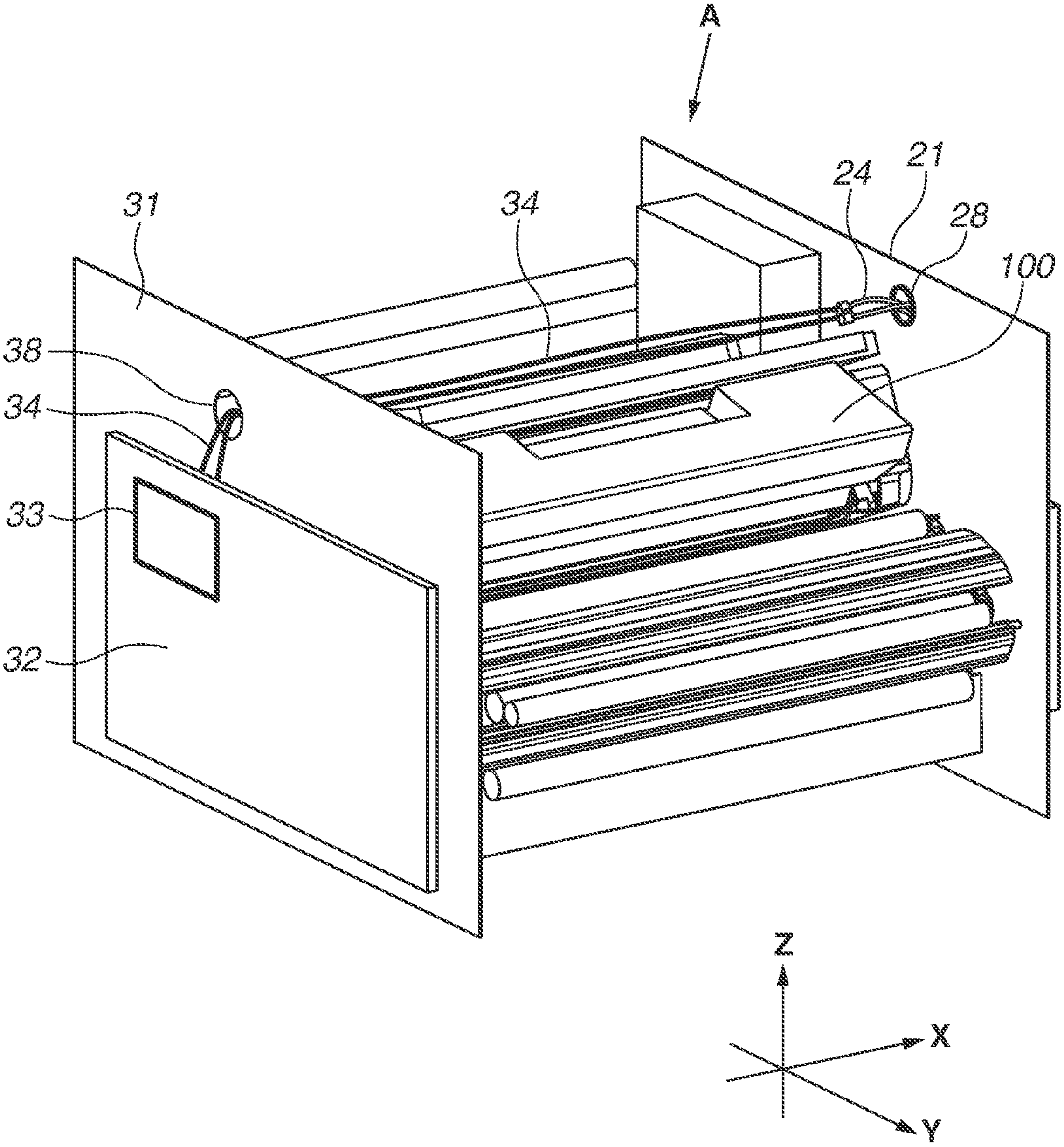
FIG. 2 is a left-side perspective view illustrating the internal structure of the image forming apparatus.
Figure 3:
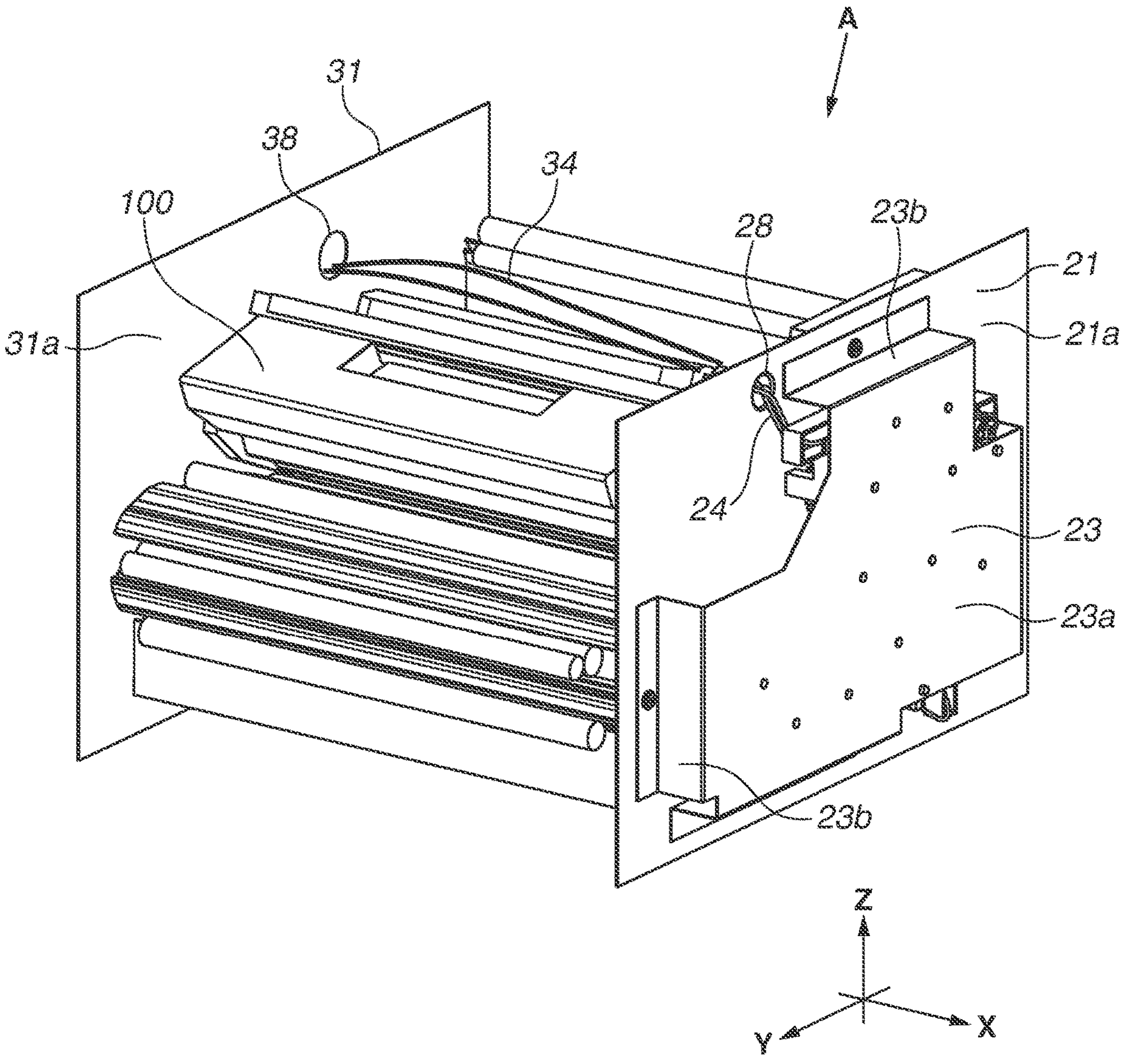
FIG. 3 is a right-side perspective view illustrating the internal structure of the image forming apparatus.

A drive configuration of the image forming apparatus A will be specifically described below. FIGS. 2 and 3 are perspective views illustrating the image forming apparatus A. FIG. 2 is a perspective view illustrating the image forming apparatus A when viewed from the left front side, and FIG. 3 is a perspective view illustrating the image forming apparatus A when viewed from the right front side. In FIGS. 2 and 3, exterior members are omitted.

As illustrated in FIGS. 2 and 3, the image forming apparatus A includes a right-side main body side plate 21 (first main body side plate) and a left-side main body side plate 31 (second main body side plate). The right-side main body side plate 21 and the left-side main body side plate 31 are disposed to interpose the process cartridge 100 between the right-side main body side plate 21 and the left-side main body side plate 31 in the X direction. In other words, the process cartridge 100 is disposed between the main body side plates 21 and 31 in the X direction. The main body side plates 21 and 31 each constitutes a part of the frame of the apparatus body 1. The main body side plates 21 and 31 are made of metal. More specifically, the main body side plates 21 and 31 are each formed of a sheet metal.

The process cartridge 100 is supported by the main body side plates 21 and 31. The main body side plates 21 and 31 each include a guide used for attaching and detaching the process cartridge 100 to/from the apparatus body 1.

The process cartridge 100 is an example of an image forming unit for forming an image on the recording material S. According to the present embodiment, the process cartridge 100 is an image forming unit detachable from the apparatus body 1. However, the image forming unit according to the present invention does not need to be detachable from the apparatus body 1.

As illustrated in FIG. 2, a control board 32 is disposed on the side opposite to the side where the process cartridge 100 is disposed across the left-side main body side plate 31, i.e., the control board 32 is disposed on the outside of the main body side plate 31. More specifically, the main body side plate 31 is disposed between the control board 32 and the process cartridge 100. This also means that the main body side plate 31 is disposed between the control board 32 and the main body side plate 21. A Central Processing Unit (CPU) 33 is mounted on the control board 32. A guide hole 38 is formed on the main body side plate 31. Cables 34 extending from the control board 32 pass through the guide hole 38 and are guided from the outside to the inside of the main body side plate 31. The CPU 33 transmits control signals to clutches (described below) via the cable 34 to control the image formation on the recording material S and the conveyance of the recording material S.

As illustrated in FIG. 3, a drive side plate 23 is disposed on the side opposite to the side where the process cartridge 100 is disposed across the right-side main body side plate 21, i.e., the drive side plate 23 is disposed on the outside of the main body side plate 21. More specifically, the main body side plate 21 is disposed between the drive side plate 23 and the process cartridge 100. This also means that the main body side plate 21 is disposed between the drive side plate 23 and the main body side plate 31. The drive side plate 23 is attached to the main body side plate 21 with screws such that a drive gear train 22 (described below) is interposed between the drive side plate 23 and the main body side plate 21. A guide hole 28 is formed on the main body side plate 21. Cables 24 connected with the cables 34 pass through the guide hole 28 and are guided from the inside to the outside of the main body side plate 21. The cables 24 are guided by a cable guide 25 (described below) and then connected with a drive unit such as clutches. The drive side plate 23 is made of metal. More specifically, the drive side plate 23 is formed of a sheet metal.

As illustrated in FIG. 3, the drive side plate 23 is bent to form an attachment portion **23*b* to be attached to the main body side plate 21. According to the present embodiment, the drive side plate 23 has a plurality of attachment portions 23*b***.

In the region between the right-side main body side plate 21 and the left-side main body side plate 31, there may be separately provided guide members (not illustrated) for holding the cables 34 and 24 and relay substrates (not illustrated) connected with the cables 34 and 24.

Figure 4:
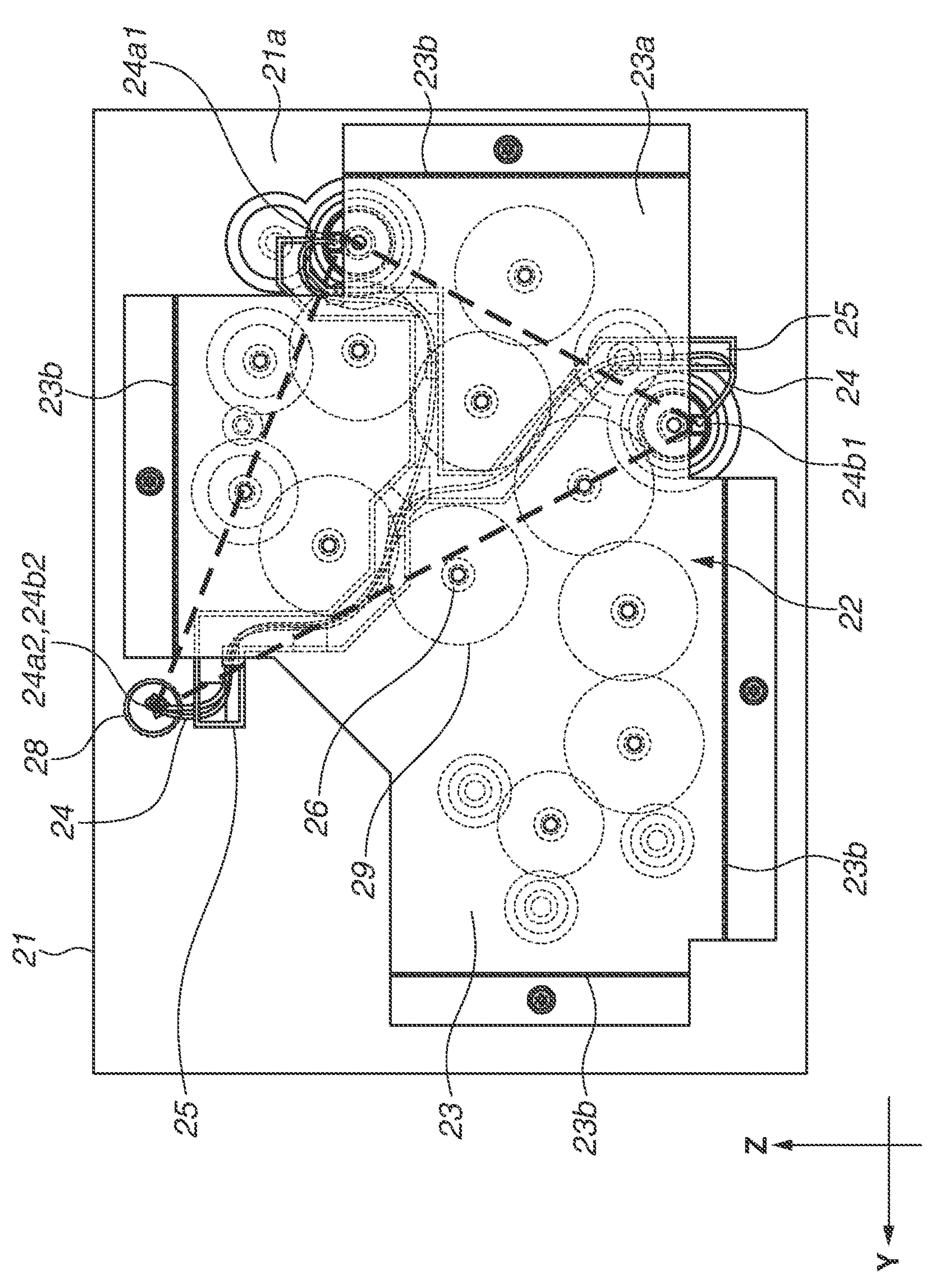
FIG. 4 is a side view illustrating a drive unit of the image forming apparatus.

FIG. 4 is a side view illustrating the image forming apparatus A when viewed from the right side. The drive gear train 22 includes a plurality of rotary gears 29. According to the embodiment, the drive gear train 22 only needs to include at least one rotary gear 29. The rotary gears 29 each rotate about a rotational shaft 26 and transmit a driving force to another gear. As described below, the rotational shafts 26 extend in the X direction. This means that the direction of the rotational shafts 26 is the X direction. In other words, the rotational axis direction of the rotary gears 29 is the X direction. The drive gear train 22 is disposed between the main body side plate 21 and the drive side plate 23. Since the drive side plate 23 is attached to the main body side plate 21 to cover the drive gear train 22 from the outside, portions hidden behind the drive side plate 23 are drawn with dotted lines.

The main body side plate 31 includes a side wall **31*a* that extends in a direction intersecting with the X direction (desirably, in a direction perpendicularly intersecting with the X direction). The main body side plate 21 includes a side wall 21*a* that extends in a direction intersecting with the X direction (desirably, in a direction perpendicularly intersecting with the X direction). Further, the drive side plate 23 includes an opposite wall 23*a*** that extends in a direction intersecting with the X direction (desirably, in a direction perpendicularly intersecting with the X direction).

The side walls **31*a* and 21*a* face each other, and the side wall 21*a* and the opposite wall 23*a* face each other in the X direction. The drive side plate 23 is attached to the side wall 21*a* and supported by the side wall 21*a*. More specifically, the attachment portions 23*b* of the drive side plate 23 extend from the opposite wall 23***a* in the X direction, and the attachment portions 23*b* are fixed to the side wall 21*a*.

One ends of the rotational shafts 26 are supported by the main body side plate 21, and the other ends of the rotational shafts 26 are supported by the drive side plate 23 in the X direction. More specifically, one ends of the rotational shafts 26 are supported by the side wall 21*a*, and the other ends of the rotational shafts 26 are supported by the opposite wall 23*a*.

The cables 24 guided from the inside to the outside of the main body side plate 21 via the guide hole 28 are further guided by the cable guide 25 in the region between the main body side plate 21 and the drive side plate 23. The cable guide 25 is disposed between the drive side plate 23 and the main body side plate 21. More specifically, the cable guide 25 is disposed between the opposite wall 23*a* and the side wall 21*a*. As described in detail below, the cable guide 25 is attached to the drive side plate 23 and guides the cables 24 along the surface of the drive side plate 23.

Figure 5:
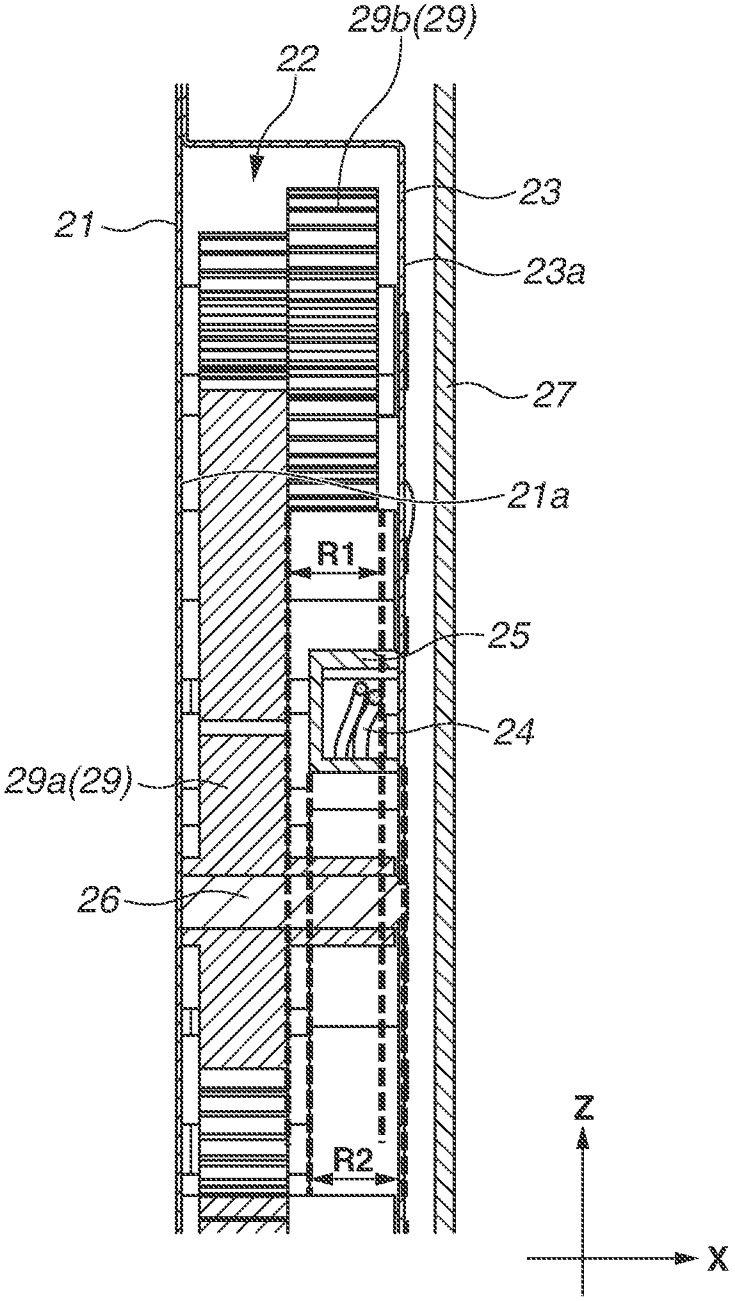
FIG. 5 is a cross-sectional view illustrating the drive unit of the image forming apparatus.

FIG. 5 is a cross-sectional view illustrating part of the drive unit of the image forming apparatus A. As illustrated in FIG. 5, the drive gear train 22, the cables 24, and the cable guide 25 are disposed between the main body side plate 21 and the drive side plate 23 in the X direction. As described earlier, the cable guide 25 is supported by the drive side plate 23. The image forming apparatus A further includes a cover member 27 disposed on the outside of the drive side plate 23 (positive side of the X direction), and the cover member 27 constitutes a part of the exterior of the image forming apparatus A. More specifically, the drive side plate 23 is disposed between the cover member 27 and the main body side plate 21 in the X direction.

As illustrated in FIG. 5, the rotary gears 29 of the drive gear train 22 are disposed between the opposite wall 23*a* and the side wall 21*a*. It can be said that a space for storing the rotary gears 29 of the drive gear train 22 is formed between the opposite wall 23*a* and the side wall 21*a*. The distance between the opposite wall 23*a* and the cover member 27 is shorter than the distance between the opposite wall 23*a* and the side wall 21*a* in the X direction.

The main body side plate 21 is provided with a rotational shaft (first rotational shaft) 26 for supporting a rotary gear 29*a* (first rotary gear). More specifically, the drive gear train 22 is supported by the main body side plate 21. The rotational shaft 26 extends in the direction perpendicular to the surface of the main body side plate 21, i.e., in the X direction. The cable guide 25 is disposed farther on the positive side of the X direction than the rotary gear 29*a*, and is disposed at a position avoiding the rotational shaft 26. The size of the rotational shaft 26 in the X direction is larger than the size of the rotary gear 29*a* in the X direction, and the cable guide 25 is disposed in the extra space. A part of the rotary gear 29*a* overlaps with the cable guide 25 when viewed in the X direction.

The drive gear train 22 also includes another rotary gear 29*b* (second rotary gear) having a larger size in the X direction than the rotary gear 29*a*. When viewed in the direction perpendicularly intersecting with the X direction, a region R1 of the rotary gear 29*b* projected on the X axis (virtual axis) extending in the X direction partly overlaps with a region R2 of the cable guide 25 projected on the X axis. In other words, the region (R1) where the rotary gear 29*b* exists at least partly overlaps with the region (R2) where the cable guide 25 exists in the X direction. This can prevent an increase in size of the image forming apparatus A in the X direction. A rotational shaft 26 supporting the rotary gear 29*b* can be also referred to as a second rotational shaft.

Figure 6:
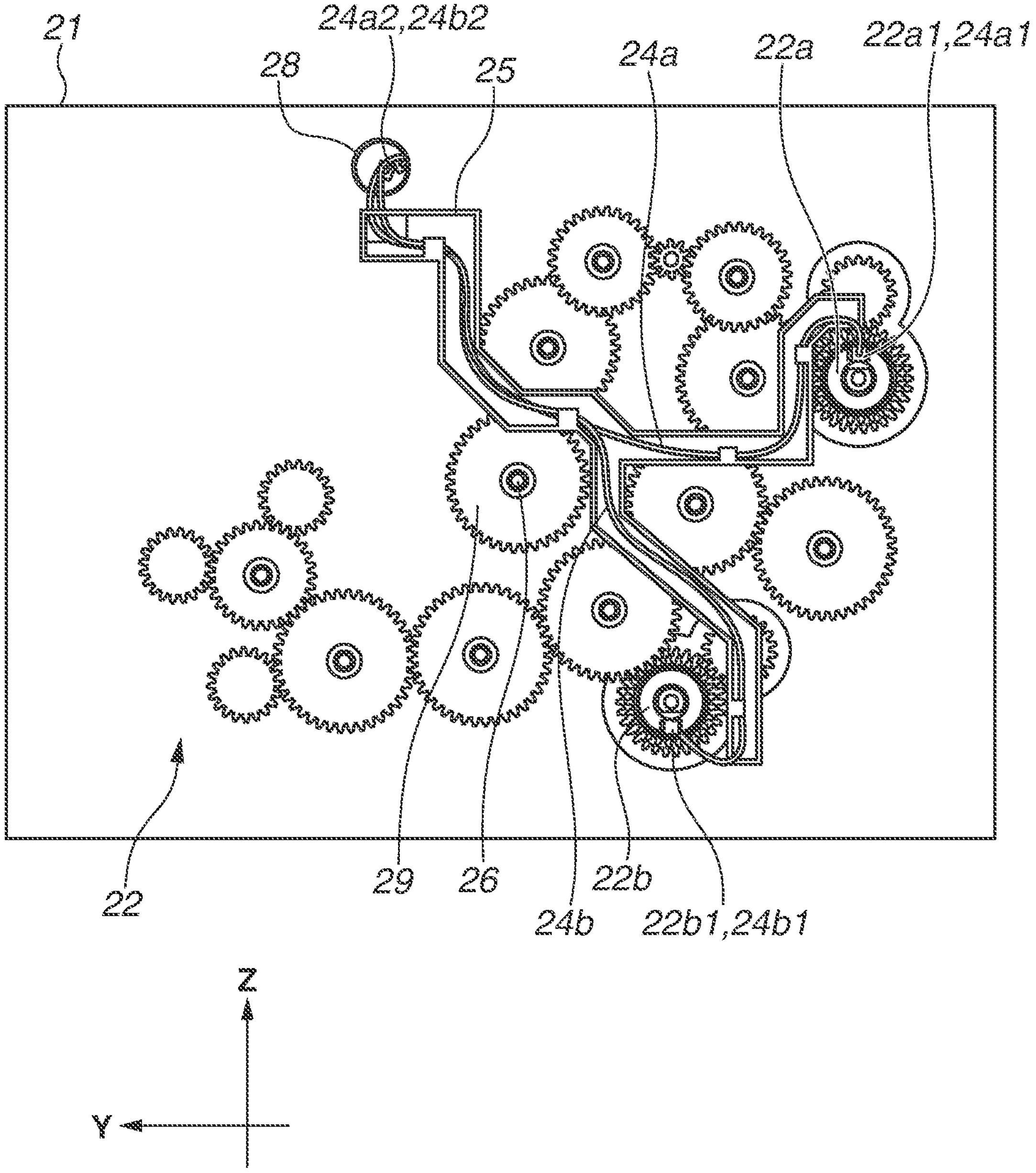
FIG. 6 is a side view illustrating the drive unit of the image forming apparatus with a drive side plate omitted.

FIG. 6 is a side view illustrating the configuration in the side view in FIG. 4, with the drive side plate 23 omitted. As illustrated in FIG. 6, the drive gear train 22 includes two electromagnetic clutches 22*a* and 22*b* configured to transmit the driving force of a motor (not illustrated) to downstream side gears when the electromagnetic clutches 22*a* and 22*b* are ON and configured to not transmit the driving force to the downstream side gears when the electromagnetic clutches 22*a* and 22*b* are OFF. The two electromagnetic clutches 22*a* and 22*b* include electromagnetic clutch connectors 22*a*1 and 22*b*1, respectively, to be connected with the cables 24. The cables 24 include two cables 24*a* and 24*b*, and the cables 24*a* and 24*b* are connected with the electromagnetic clutches 22*a* and 22*b*, respectively. One ends of the cables 24*a* and 24*b* are provided with cable connectors 24*a*1 and 24*b*1 for connection with the electromagnetic clutch connectors 22*a*1 and 22*b*1, respectively. The other ends of the cables 24*a* and 24*b* on the side opposite to the side where the cable connectors 24*a*1 and 24*b*1 are provided are provided with cable connectors 24*a*2 and 24*b*2, respectively, for connection with the cables 34 disposed on the inside of the main body side plate 21.

As illustrated in FIG. 4, when viewed in the X direction, the straight line connecting one end of the cable 24*a* (cable connector 24*a*1) and the other end thereof (cable connector 24*a*2), and the straight line connecting one end of the cable 24*b* (cable connector 24*b*1) and the other end thereof (cable connector 24*b*2) each overlap with the opposite wall 23*a* of the drive side plate 23. When viewed in the X direction, the straight line connecting the cable connectors 24*a*1 and 24*b*1 also overlaps with the opposite wall 23*a* of the drive side plate 23. The straight line connecting the cable connectors 24*a*1 and 24*a*2, the straight line connecting the cable connectors 24*b*1 and 24*b*2, and the straight line connecting the cable connectors 24*a*1 and 24*b*1 each overlap with the rotary gears 29.

The cable guide 25 is disposed between the rotational shafts 26 in a direction perpendicularly intersecting with the direction of the rotational shafts 26 of the rotary gears 29. When viewed in the X direction, the cable guide 25 is disposed between the plurality of rotary gears 29 (the plurality of gears) of the drive gear train 22. When viewed in the X direction, the cable guide 25 is disposed between the plurality of rotational shafts 26. As illustrated in FIG. 4, the cable connectors 24*a*1, 24*b*1, 24*a*2, and 24*b*2 are disposed at positions not covered by the drive side plate 23 so that they are connectable even after the drive side plate 23 is attached to the main body side plate 21. The cable connectors 24*a*1, 24*b*1, 24*a*2, and 24*b*2 are collectively referred to as cable connecting portions. The CPU 33 transmits control signals to the electromagnetic clutches 22*a* and 22*b* via the cables 34 and 24 to turn the electromagnetic clutches 22*a* and 22*b* ON and OFF.

According to the embodiment, the electromagnetic clutch 22*a* is used to change the rotational direction of the discharge roller pair 12, and the electromagnetic clutch 22*b* is used to switch between the drive and non-drive states of the two-sided conveyance roller pairs 19 and 20. However, control targets of the electromagnetic clutches 22*a* and 22*b* are not limited thereto. Members related to the image formation on the recording material S and the conveyance of the recording material S may be subjected to control.

In the configuration according to the present embodiment, when viewed in the direction of the rotational shafts 26 of the rotary gears 29 included in drive gear train 22 (when viewed in the X direction) as illustrated in FIG. 6, the drive gear train 22 and the cable guide 25 partly overlap with each other. However, the cable guide 25 is disposed at the position avoiding the rotational shafts 26. Effectively utilizing the space between the main body side plate 21 and the drive side plate 23 in this way can prevent an increase in size of the image forming apparatus A.

<Configuration of Cable Guide>

Figure 7:
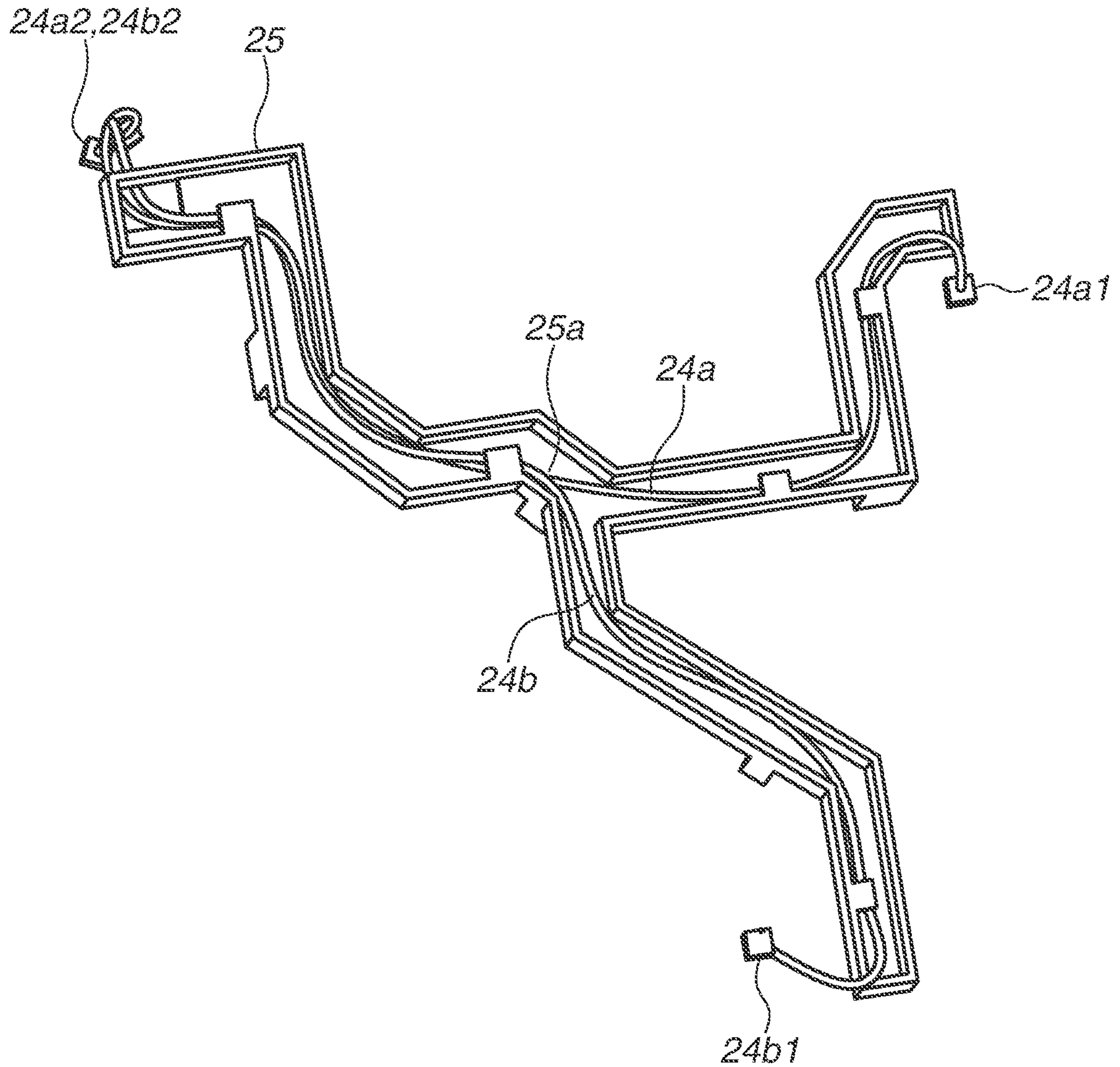
FIG. 7 is a perspective view illustrating a cable guide with cables installed.
Figure 8:
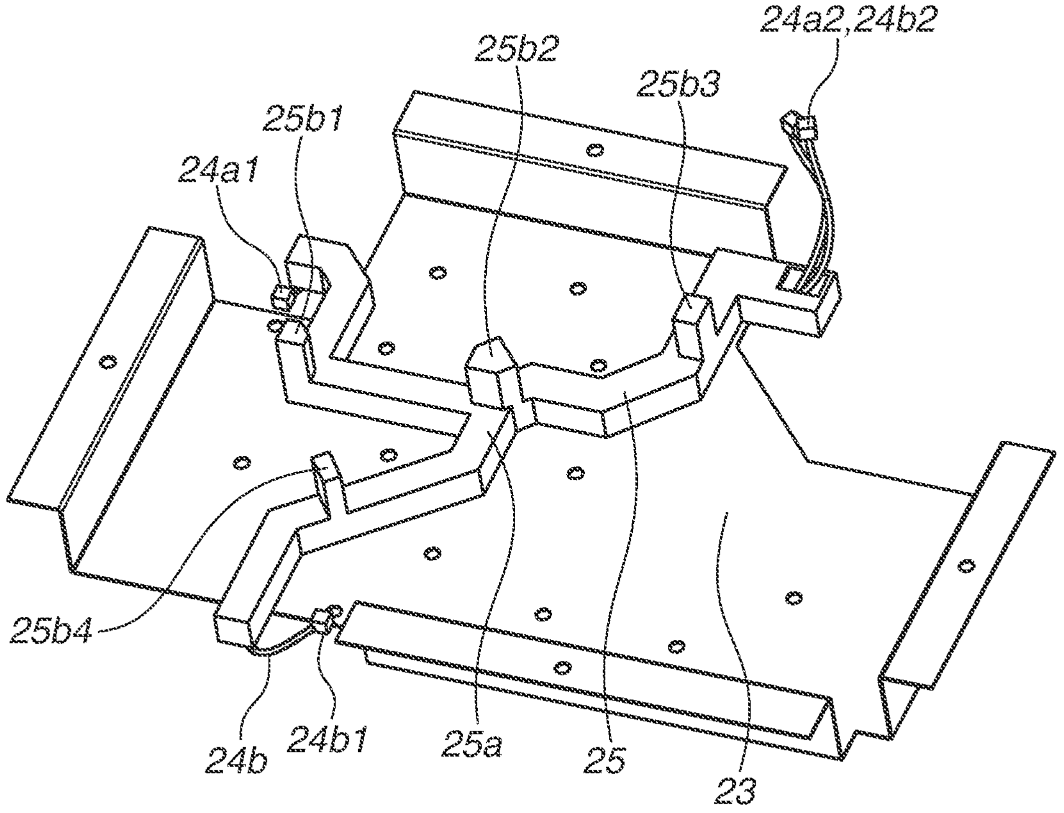
FIG. 8 is a perspective view illustrating the drive side plate with the cable guide attached.
Figure 9:
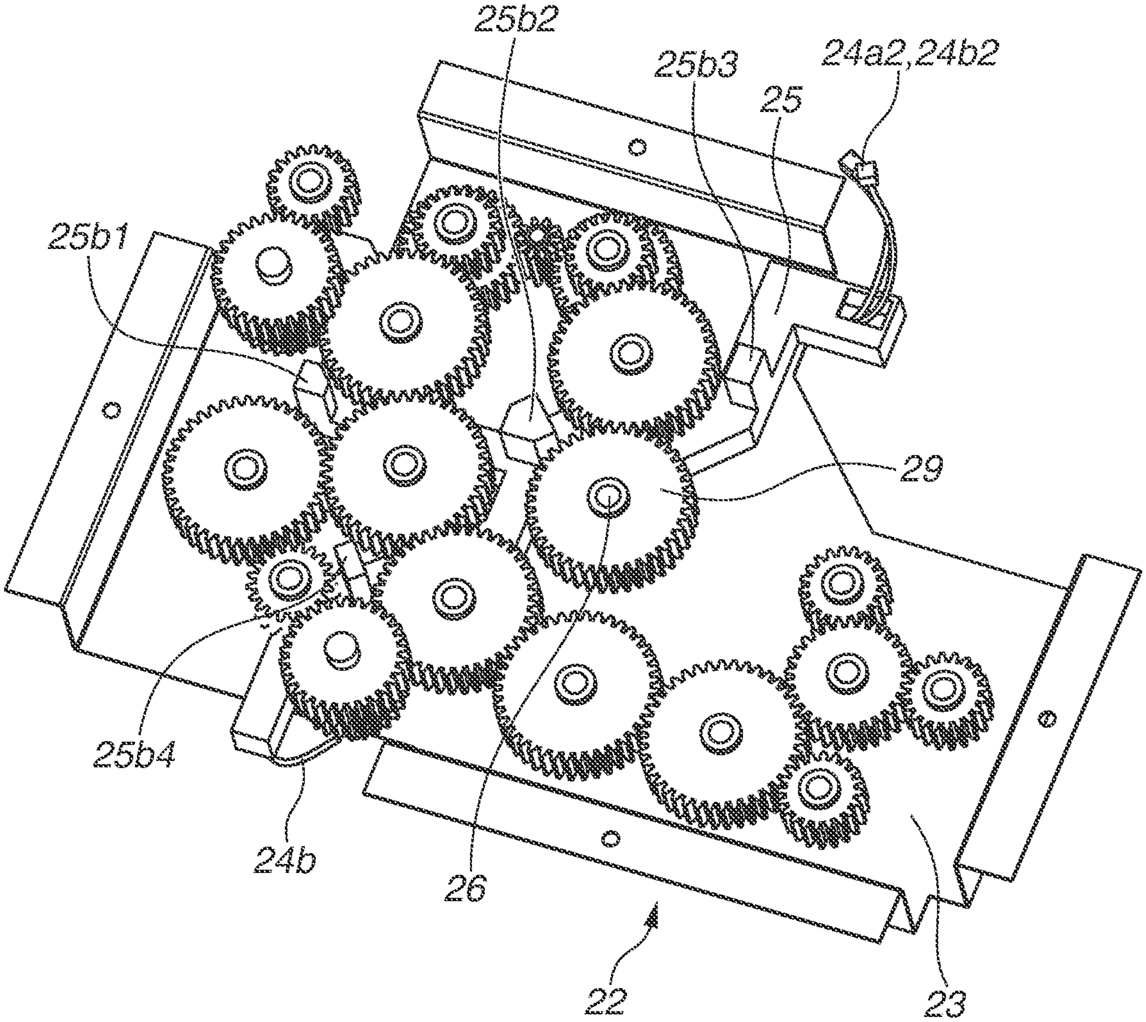
FIG. 9 is a perspective view illustrating the drive side plate and a drive gear train.

A configuration of the cable guide 25 will be specifically described below. FIG. 7 is a perspective view illustrating the cable guide 25 with the cables 24 installed. FIG. 8 is a perspective view illustrating the drive side plate 23 with the cable guide 25 attached. FIG. 9 is a perspective view illustrating the drive side plate 23 with the drive gear train 22 superimposed thereon.

As illustrated in FIG. 7, the cable guide 25 guides the two cables 24*a* and 24*b*, and the cables 24*a* and 24*b* are separated from each other at a branch point 25*a* of the cable guide 25.

The branch point 25*a* of the cable guide 25 is disposed between the rotational shafts 26 of the rotary gears 29 included in drive gear train 22. The cables 24 are held inside the cable guide 25 and guided not to come into contact with the drive gear train 22.

As illustrated in FIG. 8, the cable guide 25 is attached to the drive side plate 23. Since the cables 24 are covered by the cable guide 25 and the drive side plate 23, the cables 24 are guided not to come into contact with the drive gear train 22. Further, the cable guide 25 includes protruding portions 25*b*1 to 25*b*4 extending in the direction parallel to the rotational shafts 26 of the rotary gears 29 included in drive gear train 22.

As illustrated in FIG. 9, the protruding portions 25*b*1 to 25*b*4 of the cable guide 25 project in the direction parallel to the rotational shaft 26 and is disposed between the rotary gears 29 included in the drive gear train 22. When the drive side plate 23 is attached to the main body side plate 21, the protruding portions 25*b*1 to 25*b*4 are configured to come into contact with the main body side plate 21. This leads to improvement in the rigidity of the drive side plate 23 and also can prevent the drive side plate 23 from being deformed when it is applied with a force from the outside of the cover member 27 at the time of shipment of the image forming apparatus A. This also leads to prevention of issues, such as detachment of the rotary gears 29 included in the drive gear train 22 from the rotational shafts 26 due to deformation of the drive side plate 23.

<Effects of Present Embodiment>

According to the present embodiment, devising the wiring configuration of the cables around the drive gear train makes it possible to prevent an increase in size of the apparatus.

Further, in the configuration according to the present embodiment, the cables 24 and the cable guide 25 are connected with the shortest path without making a detour on the outside of the drive side plate 23. This makes it possible to minimize the sizes of the cables 24 and the cable guide 25, thus providing low-cost image forming apparatuses.

According to the present embodiment, the cable guide 25 mounted on the drive side plate 23 comes into contact with the main body side plate 21 via the protruding portions 25*b*1 to 25*b*4, whereby deformation of the main body side plate 21 and the drive side plate 23 can be prevented in a situation where a large external force is applied thereto at the time of shipment.

Although the above-described embodiment has been described based on the electrophotographic image forming apparatus A, the image forming apparatus A is not limited to an electrophotographic image forming apparatus. The present invention is also applicable to image forming apparatuses employing different printing methods such as ink-jet and offset printing methods.

Although, in the above-described embodiment, the cables 24 guided by the cable guide 25 are configured to transmit control signals from the CPU 33, the configuration of the cables 24 is not limited thereto. The present invention is also applicable to a configuration for guiding a power supply cable extending from a power supply board and other cables.

According to the present invention, it is possible to prevent an increase in size of an apparatus.

While the present invention has been described with reference to embodiments, it is to be understood that the invention is not limited to the disclosed embodiments but is defined by the scope of the following claims.

This application claims the benefit of Japanese Patent Applications No. 2022-178572, filed Nov. 8, 2022, and No. 2023-157460, filed Sep. 22, 2023, which are hereby incorporated by reference herein in their entirety.

What is claimed is:

1. An image forming apparatus comprising:

a first main body side plate;

a second main body side plate, the first and the second main body side plates being disposed so that an image forming unit configured to form an image on a recording material is interposed between the first and the second main body side plates;

a drive side plate attached to the first main body side plate;

a drive gear train, the drive gear train being disposed on a side opposite to a side where the image forming unit is disposed across the first main body side plate, the drive gear train being disposed between the drive side plate and the first main body side plate; and a cable guide configured to guide a cable, the cable guide being disposed between the first main body side plate and the drive side plate, wherein the drive gear train includes a rotary gear configured to rotate, and the cable guide is disposed so that the cable guide overlaps with a part of the rotary gear when viewed in a rotational axis direction of the rotary gear.

2. The image forming apparatus according to claim 1, wherein the drive gear train includes a plurality of gears, and the cable guide is disposed between the plurality of gears when viewed in the rotational axis direction.

3. The image forming apparatus according to claim 1, wherein the cable guide does not overlap with a rotational shaft of the rotary gear when viewed in the rotational axis direction.

4. The image forming apparatus according to claim 1, wherein the drive gear train includes a first rotary gear and a second rotary gear having a larger size in the rotational axis direction than the first rotary gear, and wherein the cable guide overlaps with a part of the first rotary gear when viewed in the rotational axis direction, and a region of the cable guide projected on a virtual axis extending in the rotational axis direction partly overlaps with a region of the second rotary gear projected on the virtual axis when viewed in a direction perpendicular to the rotational axis direction.

5. The image forming apparatus according to claim 1, further comprising a control board disposed on a side opposite to the side where the image forming unit is disposed across the second main body side plate, wherein the cable is configured to transmit control signals from the control board.

6. The image forming apparatus according to claim 1, wherein a connecting portion where the cable is connected with another member is disposed at a position not covered by the drive side plate when viewed in the rotational axis direction.

7. The image forming apparatus according to claim 1, wherein the cable guide is supported by the drive side plate.

8. The image forming apparatus according to claim 7, wherein the cable guide is provided with a protruding portion extending in the rotational axis direction, and the protruding portion is in contact with the first main body side plate.

9. The image forming apparatus according to claim 1, wherein the first main body side plate supports a rotational shaft of the rotary gear.

10. The image forming apparatus according to claim 9, wherein the drive side plate supports the rotational shaft.

11. The image forming apparatus according to claim 1, wherein a straight line connecting one end and the other end of the cable overlap with the drive side plate when viewed in the rotational axis direction.

12. The image forming apparatus according to claim 1, wherein the drive side plate includes an attachment portion fixed to the first main body side plate.

13. The image forming apparatus according to claim 1, wherein the drive side plate is formed of a sheet metal.

14. The image forming apparatus according to claim 1, wherein the first main body side plate is formed of a sheet metal.

* * * * *